United States Patent
Hedayat

(10) Patent No.: US 10,681,703 B2
(45) Date of Patent: *Jun. 9, 2020

(54) METHODS FOR EXCHANGING OPERATION CHANGES BETWEEN WLAN STATIONS

(71) Applicant: NEWRACOM, Inc., Lake Forest, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,608

(22) Filed: Oct. 26, 2018

(65) Prior Publication Data
US 2019/0069286 A1    Feb. 28, 2019

Related U.S. Application Data

(63) Continuation of application No. 15/291,018, filed on Oct. 11, 2016, now Pat. No. 10,142,993.
(Continued)

(51) Int. Cl.
*H04L 12/28* (2006.01)
*H04W 72/04* (2009.01)
(Continued)

(52) U.S. Cl.
CPC ......... *H04W 72/048* (2013.01); *H04W 28/18* (2013.01); *H04W 84/12* (2013.01); *H04W 88/06* (2013.01)

(58) Field of Classification Search
CPC ...................................................... H04L 12/50
(Continued)

(56) References Cited

U.S. PATENT DOCUMENTS 10,057,806 B2 * 8/2018 Hedayat ............ H04W 28/0268
2015/0173014 A1   6/2015 Lee et al.
(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.
(Continued)

*Primary Examiner* — Dang T Ton
(74) *Attorney, Agent, or Firm* — NDWE LLP

(57) ABSTRACT

A receiving station in a Wireless Local Area Network (WLAN) implements a method to initiate a change in a receive operating mode during a current transmission opportunity (TXOP) of a transmitting station. The method sends a receive operating mode change to the transmitting station, where the receive operating mode change requests changes to at least one receive operating mode parameter associated with at least one transmission from the transmitting station to the receiving station. The method further changes the at least one receive operating mode parameter based on the receive operating mode change, where the at least one receive operating mode parameter changes from higher receiver resource usage to lower receiver resource usage. Changing the at least one receive operating mode parameter occurs only after completion of the current TXOP when the at least one receive operating mode parameter changes from higher receiver resource usage to lower receiver resource usage.

20 Claims, 12 Drawing Sheets

Related U.S. Application Data

(60) Provisional application No. 62/362,305, filed on Jul. 14, 2016, provisional application No. 62/240,417, filed on Oct. 12, 2015.

(51) Int. Cl.
  *H04W 28/18* (2009.01)
  *H04W 84/12* (2009.01)
  *H04W 88/06* (2009.01)

(58) Field of Classification Search
  USPC .......................................................... 370/329
  See application file for complete search history.

(56) References Cited

U.S. PATENT DOCUMENTS

| | | |
|---|---|---|
| 2015/0181620 A1 | 6/2015 | Seok |
| 2017/0230973 A1 | 8/2017 | Noh et al. |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

Non-Final Office Action from U.S. Appl. No. 15/291,018, dated Mar. 28, 2018, 12 pages.

Notice of Allowance from U.S. Appl. No. 15/291,018, dated Aug. 7, 2018, 5 pages.

Park, et al., "Comment Resolution on ROMI," IEEE 802.11-16/0881r0, Jul. 7, 2016, 10 pages.

* cited by examiner

HT Control field

| Variant | Bit 0 (value) | Bit 1 (value) | Bit 2-29 | Bit 30 | Bit 31 |
|---|---|---|---|---|---|
| HT variant | VHT (0) | HT Control Middle | | AC Constraint | RDG More PPDU |
| VHT variant | VHT (1) | HE (0) | VHT Control Middle | AC Constraint | RDG More PPDU |
| HE variant | VHT (1) | HE (1) | Aggregated Control | | |

FIG. 4

Aggregated Control subfield of the HE variant HT Control field

Control subfield format

Control Information subfield format when Control ID subfield is 1

<HE PPDU Format>

FIG. 13

| Element | definition | duration | DFT period | GI | Subcarrier spacing | Description |
|---|---|---|---|---|---|---|
| Legacy(L)-STF | Non-high throughput(HT) Short Training field | 8 μs | - | - | equivalent to 1,250 kHz | • L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA} * 4$ μs | 3.2 μs | 0.8 μs | 312.5 kHz | HE-SIG-A is duplicated on each 20 MHz segment after the legacy preamble to indicate common control information.<br>• $N_{HESIGA}$ means the number of OFDM symbols of the HE-SIG-A field and is equal to 2 or 4. |
| HE-SIG-B | HE SIGNAL B field | $N_{HESIGB} * 4$ μs | 3.2 μs | 0.8 μs | 312.5 kHz | • $N_{HESIGB}$ means the number of OFDM symbols of the HE-SIG-B field and is variable.<br>• DL MU packet contains HE-SIG-B.<br>• SU packets and UL Trigger based packets do not contain HE-SIG-B. |

FIG. 13 (CONT.)

| Element | definition | duration | DFT period | GI | Subcarrier spacing | Description |
|---|---|---|---|---|---|---|
| HE-STF | HE Short Training field | 4 or 8 μs | - | - | • non-trigger-based PPDU: (equivalent to) 1,250 kHz; • trigger-based PPDU: (equivalent to) 625 kHz | • HE-STF of a non-trigger-based PPDU has a periodicity of 0.8 μs with 5 periods. A non-trigger-based PPDU is not sent in response to a trigger frame.<br>• The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$ * (DFT period + GI) μs | • 2xLTF: 6.4 μs • 4xLTF: 12.8 μs | supports 0.8, 1.6, 3.2 μs | • 2xLTF: (equivalent to) 156.25 kHz; • 4xLTF: 78.125 kHz | • HE PPDU shall support 2xLTF mode and 4xLTF mode.<br>• In the 2xLTF mode, HE-LTF symbol excluding GI is equivalent to modulating every other tone in an OFDM symbol of 12.8 μs excluding GI, and then removing the second half of the OFDM symbol in time domain.<br>• $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | • $N_{DATA}$ means the number of HE data symbols. |

METHODS FOR EXCHANGING OPERATION CHANGES BETWEEN WLAN STATIONS

CROSS-REFERENCE TO RELATED APPLICATIONS

This application is a continuation of U.S. application Ser. No. 15/291,018, filed Oct. 11, 2016, which claims the benefit of U.S. Provisional Application 62/240,417, filed Oct. 12, 2015, and U.S. Provisional Application No. 62/362,305, filed Jul. 14, 2016, which are hereby incorporated by reference.

FIELD OF INVENTION

The embodiments are related to the field of Wireless Local Area Network (WLAN) operation. More specifically, the embodiments relate to a method and apparatus for a station to alter its receive operating mode without interfering with a current transmission opportunity. Other embodiments are also disclosed.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW supports the negotiation between STAs of the parameters of the operating mode, which includes the determination of the parameters of the channels in terms of bandwidth, number of spatial streams and similar parameters.

SUMMARY

The embodiments include a method implemented by a receiving station in a Wireless Local Area Network (WLAN). The method initiates a change in a receive operating mode during a current transmission opportunity (TXOP) of a transmitting station. The method sends a receive operating mode change to the transmitting station, where the receive operating mode change requests changes to at least one receive operating mode parameter associated with at least one transmission from the transmitting station to the receiving station. The method further changes the at least one receive operating mode parameter based on the receive operating mode change, where the at least one receive operating mode parameter changes from higher receiver resource usage to lower receiver resource usage. Changing the at least one receive operating mode parameter occurs only after completion of the current TXOP when the at least one receive operating mode parameter changes from higher receiver resource usage to lower receiver resource usage. Changing of the at least one receive operating mode parameter can also occur during the current TXOP where the receive operating mode parameter changes from lower receiver usage to higher receiver resource usage.

Additional embodiments provide a method implemented by a transmitting station in a WLAN to initiate a change in a receive operating mode during a TXOP of the transmitting station. The method may be used as a complementing process to the embodiments present processes for the receiving station. The method receives a receive operating mode change from a receiving station, where the receive operating mode change requests changes to at least one receive operating mode parameter associated with at least one transmission from the transmitting station to the receiving station. The method further changes the at least one receive operating mode parameter based on the receive operating mode change, where the at least one receive operating mode parameter changes from higher receiver resource usage to lower receiver resource usage. Changing the at least one receive operating mode parameter occurs only after completion of the current TXOP when the at least one receive operating mode parameter changes from higher receiver resource usage to lower receiver resource usage. The changing of the at least one receive operating mode parameter can occur during the current TXOP where the changes to the receive operating mode parameter are from lower receiver resource usage to higher receiver resource usage.

In further embodiments, a method is implemented by a first station in a WLAN to initiate a change in a receive operating mode during a current TXOP of a second station. The method determines whether to change a receive operating mode parameter during the current TXOP and executes the change of the receive operating mode parameter during the current TXOP where the change to the receive operating mode parameter increases receiver resource usage, in response to receiving an acknowledgement of the change from the second station. Where the receive operating mode parameter decreases receiver resource usage, the change may be implemented without receiving the acknowledgment.

BRIEF DESCRIPTION OF THE DRAWINGS

Embodiments are illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 4 is a diagram of one embodiment of the format of a high throughput (HT) control field.

FIG. 13 is a diagram of a table providing additional PPDU frame format information.

DETAILED DESCRIPTION

Figure 1:
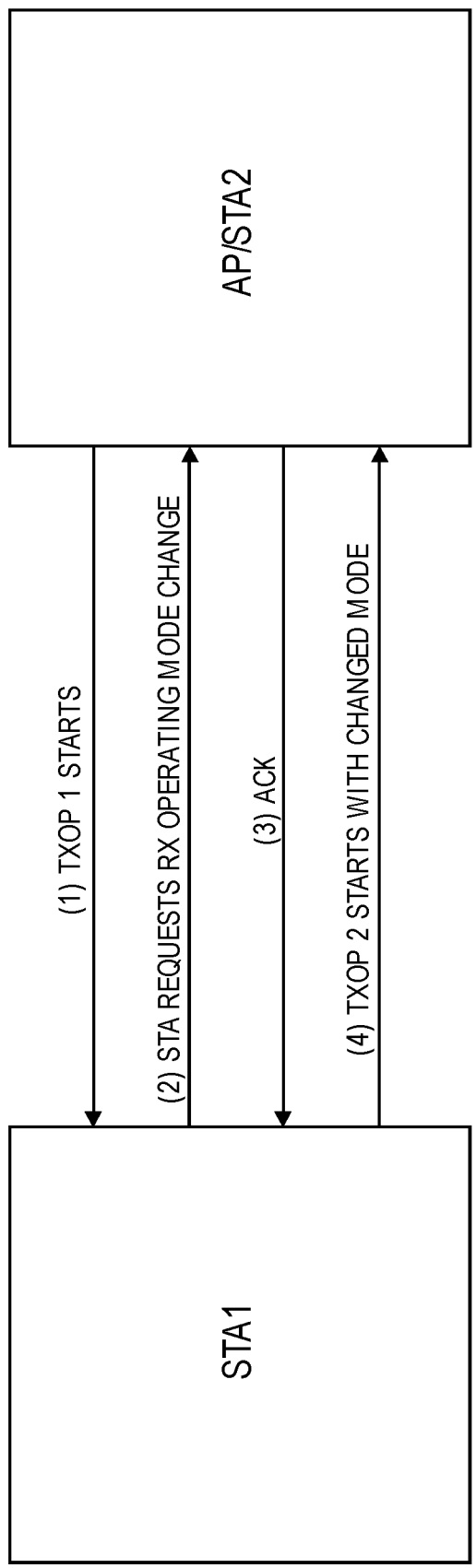
FIG. 1 is a diagram illustrating the negotiating of a receive (RX) operating mode between a station (STA) and another STA or access point (AP).

The embodiments disclosed herein provide a method that can be used between any stations (STAs) in a wireless local area network (WLAN) including between an access point (AP) and a STA where either of the STAs wish to change its operating mode (e.g., bandwidth and number of spatial streams) for a duration of time such as a transmission opportunity (TXOP). Particularly, the embodiments provide a method and system whereby implicit indications are exchanged between a requesting STA and a responding STA so that the change of a receive (RX) operating mode will not adversely affect the data transmission between the two STAs negatively. The requesting STA is the STA that seeks to change the parameters of the operating mode to enable the requesting STA to change the RX operating mode of the requesting STA, whereas the responding STA is the STA that adjusts the operating mode by accommodating the RX operating mode of the requesting STA by changing its transmitting mode.

The embodiments provide a set of methods for handling the operating mode transition. These embodiments ensure that the change of RX operating mode happens at the right time, without loss of data, such as dropped data frames due to one of the two STAs being either unaware of the RX operating mode change or being early or late in handling the RX operating mode change.

In one method, a set of request/confirm indicators are introduced in a high efficiency (HE) Control field that appears in the media access control (MAC) header of a MAC protocol data unit (MPDU). In another method, no explicit indicators are used to indicate the request/confirm status of the operating mode change. Instead, a set of rules are set so that the change of RX operating mode does not happen in the middle of a TXOP. Additional embodiments provide variations on these methods. Other embodiments are also described and claimed.

In the following description, numerous specific details are set forth. However, it is understood that embodiments may be practiced without these specific details. In other instances, well-known circuits, structures and techniques have not been shown in detail in order not to obscure the understanding of this description. It will be appreciated, however, by one skilled in the art that embodiments may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a WLAN. STAs are devices connected to and communicating in a WLAN including client or user devices that connect to the WLAN via APs. APs are network devices that may be specialized wireless access points that can communicate with other network devices in the WLAN via the wireless medium or via wired connections. A STA or AP may be referred to herein as a WLAN device.

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW can support operating mode changes between any two STAs. However, the HEW does not provide an optimally efficient transition between all operating modes.

The embodiments provide several methods that can be used between any two STAs, including between an AP and a non-AP STA, where either of the STAs seek to change its operating mode (e.g., such as bandwidth and number of spatial streams (Nss)) for a duration of time. The embodiments can be categorized as falling within two sets of methods that are described herein. Each of the methods ensures that the change of a RX operating mode happens with the correct timing, such that the change is without loss of any data frames due to one of the two STAs being either unaware of the RX operating mode change or being early or late in supporting the change of the RX operating mode.

The embodiments provide a more efficient management of the transitions of operating modes for the STAs involved. It is important for power saving purposes that a STA changes its operating mode to reduce the amount of bandwidth and number of spatial streams that are active along with the associated hardware. This reduction in resource consumption thereby reduces power requirements of the implementing network device. In particular, power consumption at the network device can be reduced if the operating mode transition is from a higher bandwidth to a narrower bandwidth during the times that the network device does not expect to use the wider bandwidth. Also, it is important for power saving purposes that a STA changes its operational number of receive antennas and number of receive spatial streams to the fewer number of receive antennas and fewer number of receive spatial streams.

In some methods, a STA may signal its desire to change to a narrower bandwidth or fewer spatial streams by setting some indication fields in the HE Control field in the MAC header of a data frame. In these methods, a STA might use an extended high throughput (HT) Control field (which could be referred to as a HE Control field) in an uplink (UL) data payload to tell its AP or peer STA what changes in its operational bandwidth or operational number of receive spatial streams that the sending STA is seeking to switch to or otherwise utilize. The STA requesting the change to the RX operating mode may in some embodiments automatically change the RX operating mode parameters or wait for an ACK from the AP or peer STA before making the change.

In some methods, a transmitting STA indicates its RX operating mode, i.e. its RX Nss and/or RX channel bandwidth, in the MAC header of a transmitted data frame during a transmission opportunity (TXOP). The responding STA (i.e., the STA receiving the transmission during the TXOP interval) will not transmit a subsequent frame using an Nss or channel width value not indicated as supported in the RX operating mode of the transmitting STA. In such mechanisms, the indication for setting the RX operating mode may be within the HE Control field of the MAC header, where the HE Control field carries (a) an indication that the content of the HE Control field is associated with the RX operating mode, (b) an indication about the bandwidth that is going to be utilized (RX bandwidth), (c) an indication about the number of spatial streams that is going to be utilized (RX Nss). In some embodiments, only one of items (b) and (c) may be included in the RX operating mode HE Control field.

However, changes to the operating mode in the methodology need to happen according to strict rules so that both the transmitting STA or AP and the receiving STA know exactly when the change in bandwidth or number of spatial streams is going to happen. Otherwise, it is likely that a receiving STA will lose some transmitted frames due to the change of RX operating mode. For instance, one STA may be in the middle of sending a set of pending frames to the second STA, but the second STA, unaware of the remaining pending frames, might change its operating mode. Thus, some of the frames will not be properly received by the second STA, because the second STA has made an operating mode change prior to the first STA making similar changes for the transmission.

FIG. 1 is a diagram of a process for handling an operating mode change between a transmitting STA or AP and a receiving STA or AP. The process can be executed between any two STAs or between a STA and an AP. In the illustrated example, the AP or STA2 is transmitting to STA1 during a TXOP interval (1). The AP or STA2 can transmit while the STA1 can send response frames, when requested, for the length of the TXOP interval. In some embodiments, ownership of the TXOP can transfer from the AP or STA2 to STA1. In such as case, STA1 may transmit for the remainder of the TXOP or until the TXOP is transferred back to AP/STA2. In further embodiments, STA1 is also able to transmit during the TXOP, even when the TXOP is owned by AP/STA2. For example, AP may transmit a trigger frame during the TXOP to cause STA2 and one or more other stations to respond with a UL multi-user (MU) response during the TXOP. In this example, during the TXOP interval, the STA1, unaware of potentially remaining pending frames at the STA2 and their attributes, seeks to change its RX operating mode. This may enable the STA1 to reduce the amount of power it expends communicating with the AP or STA1. To initiate this change, STA1 sends an RX operating mode change request (2) to AP or STA2 in one of the response frames that STA1 sends to STA2. The request for the RX operating mode change can be indicated in HE control fields of a MAC header or similarly provided to AP or STA2. In some embodiments, AP or STA2 may send a frame that includes a confirmation/acknowledgement (3) that AP or STA2 has received the request for RX operating mode change. In subsequent TXOP 2 interval, AP or STA2 when transmitting to the STA1 will transmit (4) within the parameters of the updated RX operating mode of STA1.

There may be several manners to implement the handling of operating mode changes and in particular, the embodiments herein focus on methods and systems for handling RX operating mode changes that ensure no loss of frames and no inefficiency due to untimely RX operating mode changes. The faster that a RX operating mode can be accomplished, the greater the power savings. Some processes for handling RX operating mode changes are not optimal for all scenarios. The embodiments encompass varying implementations that can be broadly grouped into those where a confirmation is provided by the transmitting STA and those where no confirmation is utilized.

In some embodiments, there exists a Request Indicator in the HE Control field (within the sub-field that is associated with RX operating mode) where the Request Indicator indicates that a STA is making a request for changes in the RX operating mode. In some embodiments, this bit may not be used and the mere fact that a STA sends a data frame whose MAC header carries an RX operating mode sub-field will be interpreted as a request to change to the RX operating mode. In some embodiments, there exists a Confirm Indicator in the HE Control field (within the sub-field that is associated with RX operating mode) where the Confirm Indicator indicates that a STA confirms the request for the changes in RX operating mode that has been sent previously by a requesting STA.

In the embodiments where the above-listed indicators (i.e., the Request Indicators and Confirm Indicators) are present in the MAC header (e.g., in the HE Control field), the following one or more rules may apply. A STA that requests an RX operating mode change in a transmitted data frame MAC header shall set the Request Indicator in the MAC header to indicate the request status of the RX operating mode change. A STA that requests an RX operating mode change in a transmitted data frame MAC header does not change its RX operating mode until the STA receives the first data frame from the responding STA with the Confirm Indicator in the MAC header that indicates the confirm status of the requested operating mode change. Thereafter, the STA changes its RX operating mode after it has received the first data frame with the Confirm Indicator in the MAC header indicating the confirm status, if the requested RX operating mode change has wider bandwidth (BW) or more Nss. A STA that responds to an RX operating mode change received in a data frame MAC header may set the Confirm Indicator in the MAC header to indicate the confirm status of the requested RX operating mode change. In some embodiments, a STA that responds to a RX operating mode change received in a data frame MAC header, sets the Confirm Indicator in the MAC header within a predetermined time interval, to indicate the confirm status of the requested RX operating mode change.

After sending the data frame to the requesting STA with the confirm status (e.g., the Confirm Indicator in the HE Control field of MAC header) the responding STA will not send data frames to the requesting STA unless the data frames meet the earlier requested RX operating mode change, if the requested RX operating mode change has narrower BW or less Nss. In some embodiments, after sending the data frame to the requesting STA with the confirm status set, the responding STA shall not send any frame to the requesting STA within a predetermined time interval, after which the responding STA shall not set frames to the requesting STA unless the said frames met the earlier requested RX operating mode change, if the requested RX operating mode change has narrower BW or less Nss.

In the above scenarios and embodiments, the requesting STA (i.e., the STA requesting the RX operating mode change) may be a non-AP STA and the responding STA may be an AP. However, it is possible that both responding and requesting STAs are non-AP STAs. This is the case where the requesting and responding STAs are part of a direct link setup (DLS) or, tunneled DLS (TDLS).

In some embodiments, the MAC header and HE Control field may not carry the above-mentioned Request Indicator and Confirm Indicator. In such cases, one or more of the following rules may be applied to ensure that the change of the RX operating mode does not happen in the middle of a TXOP and instead, even if the request is made by the requesting STA in the middle of a TXOP, the actual change of the RX operating mode happens after the TXOP completes/terminates.

A STA that requests a RX operating mode change in a transmitted data frame MAC header, keeps the original (i.e. the existing) RX operating mode for all the frames sent subsequently during the current TXOP, until the first ACK or BA frame (or any response frame or any equivalent ACK or BA indication in a received data frame) is received for one of such frames during the said TXOP interval. This ensures that the responding STA has successfully received the indication for change of RX operating mode. In another embodiment, the requesting STA keeps operating in the original RX operating mode until the end of the current TXOP. The requesting STA shall change its operating mode the indicated status after the current TXOP if the requested operating mode change has a wider BW or more Nss. If the requesting STA does not receive any acknowledgement (ACK) or block acknowledgment (BA) frame (or any response frame or any equivalent ACK or BA indication in a received data frame) during the current TXOP, then the requesting STA assumes that the RX operating mode change has not been received successfully and the STA shall operate with its original RX operating mode after the current TXOP and may repeat its RX operating mode change indication in the subsequent data frames it sends.

In some embodiments, a STA that receives a RX operating mode change in a data frame MAC header, applies the original RX operating mode to all the frames sent until the end of the current TXOP. The responding STA sends data frames with the requested RX operating mode, after the current TXOP, if the requested RX operating mode change has narrower BW or less Nss. In an embodiment, a STA that wants to send an RX operating mode change in a MAC header of a frame will not do so in the middle of the current TXOP in order to avoid interruption to its peer STA (e.g., its associated AP). In this embodiment, the STA may send the RX operating mode change in a frame at the end of the TXOP, i.e., when the Duration field in the MAC header of the previously received frame is less than a predetermined value. In this embodiment, only a STA that is the TXOP-holder may send an RX operating mode change in a frame MAC header as its last frame in the TXOP (and there could be a response to that last frame). In a further embodiment, only a STA that is the TXOP-holder may send an RX operating mode change in a frame MAC header anytime during a TXOP.

These rules and scenarios are improved upon with the embodiments presented herein. In particular, the embodiments provide a process and system for a STA that seeks to send an RX operating mode change in a frame MAC header where the STA will allocate the RX operating mode change in the operating mode indication in the MAC header, for example in the HE Control filed (also known as aggregated-control or A-Control filed) of the HE frame. The overall process as implemented by the requesting STA and the responding STA are illustrated in FIGS. 2 and 3, respectively.

Figure 2:
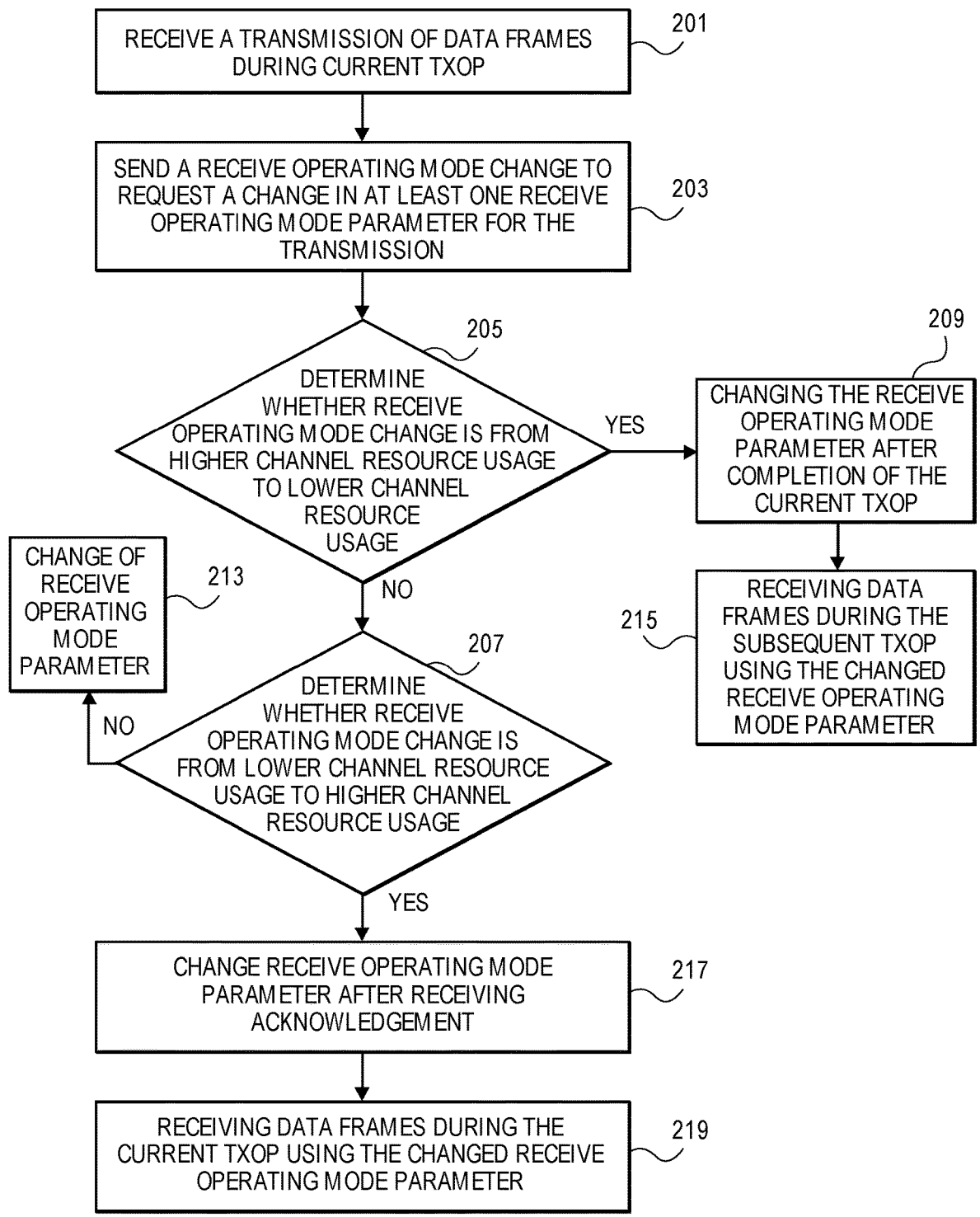
FIG. 2 is a flowchart of one embodiment of a process for the operation of a STA requesting a change in the RX operating mode.
Figure 3:
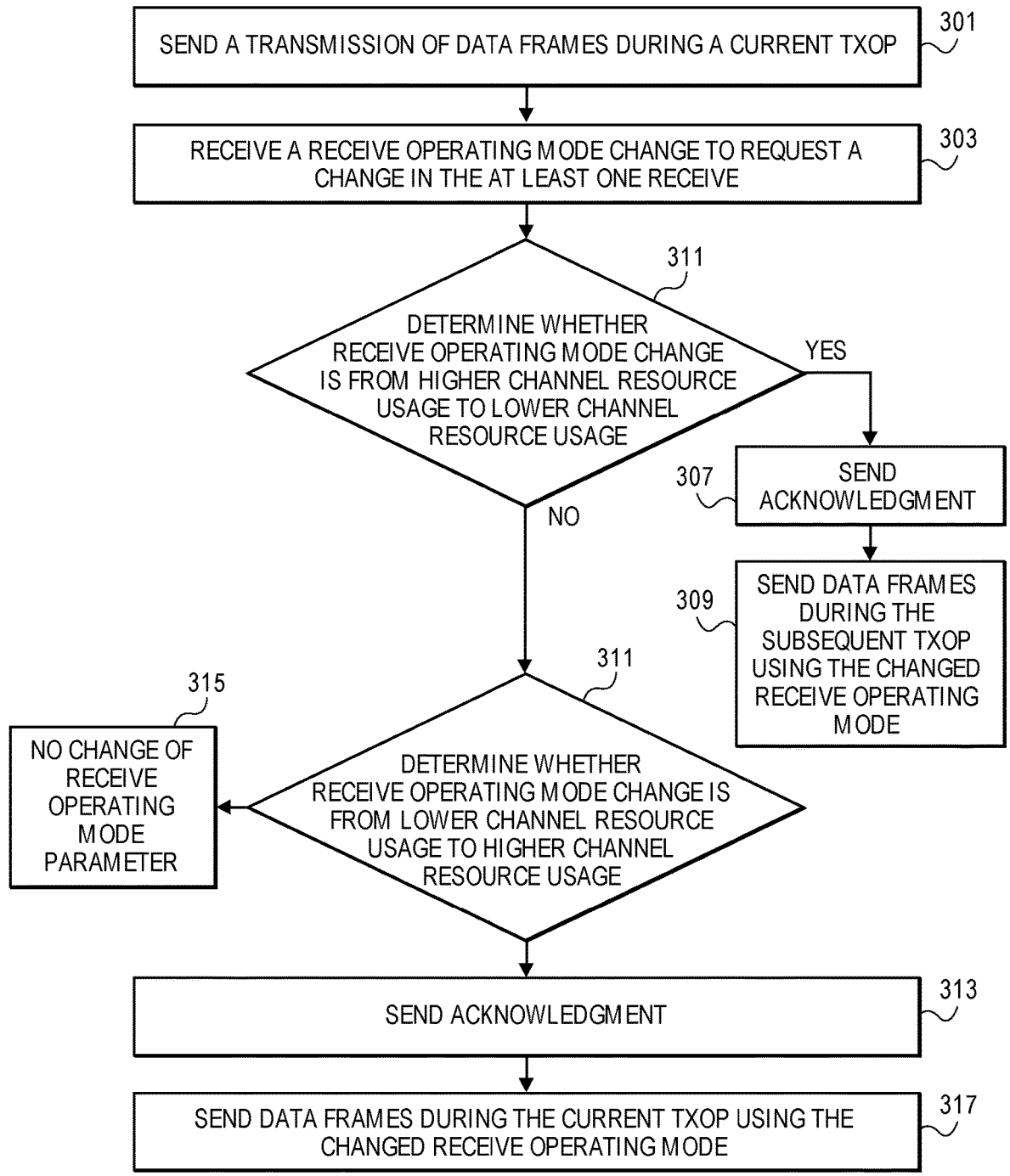
FIG. 3 is a flowchart of one embodiment of a process for a transmitting STA or AP for handling a request for the changing of a RX operating mode by the requester.

FIG. 2 is a flowchart of one embodiment of a process for the operation of a STA requesting a change in the RX operating mode. The STA that seeks to change the RX operating mode will begin to receive data frames from the transmitting STA or AP during a TXOP (Block 201). At any time during the TXOP the STA seeking to change the RX operating mode may send a data frame with a MAC header indicating the RX operating mode parameters for an RX operating mode change (Block 203).

The embodiments vary operation of the requesting STA with regard to the conditions and timing of the implementation of the RX operating mode change. In one embodiment, the STA that sends an RX operating mode change in the data frame MAC header implements the changes to the RX operating parameters, i.e., the RX Nss and RX BW or Channel Width, dependent on a check on how the operational parameters are affected (Blocks 205 and 207). The RX operating mode parameter changes either increases receiver resource usage (i.e., increases/widens RX BW or Channel Width or more Nss) or decreases receiver resource usage (i.e., decreases/narrows RX BW or Channel Width or fewer Nss). How the process and system of the receiving STA react to these variations varies.

In one embodiment, when the requesting STA (i.e., the STA requesting the RX operating mode change) changes a RX operating mode parameter from higher to lower, the requesting STA makes the change for that parameter only after completion of the current TXOP (Block 211). Data frames during the subsequent TXOP use the changed RX operating mode parameters (Block 215).

When the requesting STA changes the RX operating mode parameters from lower to higher, the requesting STA makes the change for that parameter either after an ACK Timeout has expired or after receiving the acknowledgement frame from the responder (Block 217). Data frames received during the current TXOP use the changed RX operating mode parameter (Block 219). If the RX operating mode parameter changes do not affect the receiver resource usage then they can be changed at any time including after the TXOP completion or during the current TXOP (Block 213).

In another embodiment, the requesting STA sends an RX operating mode change in a frame MAC header as the last data frame of a TXOP and expects a response for that data frame. The requesting STA changes the RX operating parameters, i.e., the RX Nss and RX BW or Channel Width, dependent on the check on how the operational parameters affected receiver resource usage, which operates as follows:

When the requesting STA changes an RX operating mode parameter from higher to lower, the STA makes the change for that parameter only after receiving the acknowledgement frame from the responder.

When the requesting STA changes the RX operating mode parameter from lower to higher, the requesting STA makes the change for that parameter either after ACK Timeout has expired or after receiving the acknowledgement frame from the responder.

In a third embodiment, the requesting STA sends an RX operating mode change in a frame MAC header in the middle of a TXOP and changes its RX operating mode, i.e., the RX Nss and RX BW or Channel Width, dependent on the check on how the operational parameters affected receiver resource usage, which operates as follows:

When the requesting STA changes its RX operating mode from higher to lower and the requesting STA receives the acknowledgement frame from the transmitting STA, the requesting STA makes the change for that parameter after the TXOP. Thus, in this embodiment no determination of an acknowledgement is made or expected.

When the requesting STA changes its RX operating mode from lower to higher, the requesting STA makes the change for that parameter after the TXOP regardless of reception of the acknowledgement frame from the responder. In another variation of this embodiment, the requesting STA makes the change for that parameter either after an ACK Timeout has expired or after receiving the acknowledgement frame from the responder.

In a fourth embodiment, a requesting STA sends an RX operating mode change in a frame MAC header in the middle of a TXOP and changes its RX operating mode, i.e., the RX Nss and RX BW or Channel Width, dependent on the check on how the operational parameters affected receiver resource usage, which operates as follows:

When the requesting STA changes its RX operating mode from higher to lower and the requesting STA received the acknowledgement frame from the transmitting STA (Block 209), the requesting STA makes the change for that parameter after the TXOP). In a further variation on this embodiment, the requesting STA may or may not change its RX operating mode after the TXOP (Block 211).

When the requesting STA changes its RX operating mode from lower to higher, the requesting STA makes the change for that parameter after the TXOP regardless of reception of the acknowledgement frame from the responder. In another embodiment, the requesting STA makes the change for that parameter either after ACK Timeout has expired or after receiving the acknowledgement frame from the responder.

In some embodiments, a STA that requests a RX operating mode change in a transmitted data frame MAC header with duration field set to zero, does not apply the change to its RX operating mode until it receives the ACK or BA frame (or any equivalent response frame or ACK or BA indication in a received data frame) is received, after which the requesting STA applies the RX operating mode change. The requesting STA changes its operating mode after it receives the acknowledgment frame if the requested operating mode change has a wider BW or more Nss. If the requesting STA does not receive any ACK or BA frame (or any equivalent response frame or ACK or BA indication in a received data frame) then the requesting STA assumes that the RX operating mode change has not been received successfully and the requesting STA operates with its original RX operating mode.

FIG. 3 is a flowchart of one embodiment of a process for a transmitting STA or AP for handling a request for the changing of a RX operating mode by the requester. The transmitting STA or AP may start the transmitting of data frames to the receiving STA during a TXOP (Block 301). The transmitting STA or AP may receive an RX operating mode change in a data frame MAC header (Block 303), where the RX operating mode change identifies at least one change to a RX operating mode parameter. A determination may then be made whether the requested change to the RX operating mode parameter results in a higher receiver resource usage or in a lower receiver resource usage (Blocks 305 and 311).

The transmitting STA or AP may in some embodiments send an acknowledgment frame to the requesting STA with the original RX operating mode (Blocks 307 and 313). The transmitting STA can send data frames with the requested RX operating mode, during a subsequent TXOP or after a predetermined time interval, if the requested RX operating mode change has gone from a higher to lower receiver resource usage (i.e., a wider BW or more Nss) (Block 309). Whereas, the transmitting STA or AP can send data frames with the requested RX operating parameters during the current TXOP, when the receiver resource usage has gone from low to high.

While the embodiments have been discussed in reference to a TXOP in the above examples and scenarios, in some embodiments instead of a "current TXOP," a "current Beacon interval" is preferred. Also, while in the above examples and embodiments the requesting STA is usually a non-AP STA and transmitting/responding STA is usually an AP, it is possible that both the transmitting/responding and requesting STAs are non-AP STAs. This is the case where the requesting and transmitting/responding STAs are part of an DLS or TDLS.

An AP that sends a data frame with an RX operating mode change to a STA can only change its RX operating mode with that STA. In order for the AP to change its RX operating mode for all the associated STAs, the AP shall send data frames, Null data frames, or frames that carry MAC header with RX operating mode change to each associated STA, or to all the associated STAs. In some embodiments, where an AP wants to changes its RX operating mode with a set of STAs, it might do so as follows.

In one embodiment, the AP sends a down link multi user (DL MU) frame to the set of STAs and it would indicate its desired RX operating mode change in the HE Control field of the MAC header of each of the payloads. The AP also schedules for a multiplexed response frame from the same set of STAs. The set of STAs respond in a subsequent up link multi user (UL MU) frames, either with acknowledgment frames (i.e. ACK or BA frame or any equivalent ACK or BA indication in a received data frame). In some embodiments, the responding STAs set the Confirm indicator within the HE Control field of the MAC header of their corresponding frame. In one embodiment, the AP sends a broadcast or multicast data frame in a single user (SU) format to the set of STAs and it would indicate its desired RX operating mode change in the HE Control field of the MAC header. Then the AP sends a MU BAR frame to a set or a subset of the STAs addressed in the multicast frame, after which the set of STAs respond in a subsequent UL MU frame, either with acknowledgment or data frame (i.e. ACK or BA frame or any equivalent ACK or BA indication in a received data frame). In some embodiments, the responding STAs set the Confirm indicator within the HE Control field of the MAC header of their corresponding frame.

FIG. 4 is a diagram of one embodiment of the format of a high throughput (HT) control field. This control field can have variant formats in its use in a MAC header depending on the technology HT, very high throughput (VHT) or HE. As is related to the operating mode changes herein, the Aggregated control subfield can be used to include identifiers related to the operating mode change.

Figure 5:
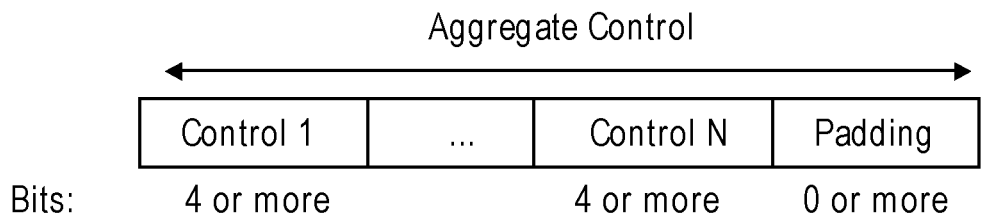
FIG. 5 is a diagram of one embodiment of the format of the aggregated control subfield of the HE variant HT control field.
Figure 6A:
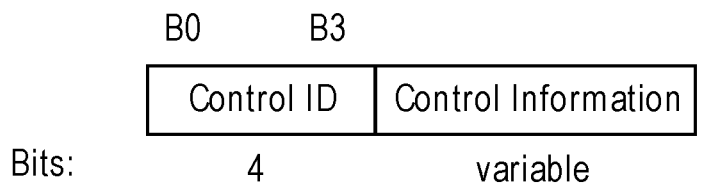
FIG. 6A is a diagram of one embodiment of the format of the control subfield.
Figure 6B:
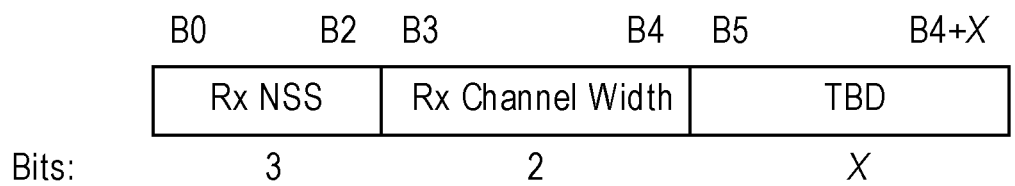
FIG. 6B is a diagram of one embodiment of the format of the control information subfield.

FIG. 5 is a diagram of one embodiment of the format of the aggregated control subfield of the HE variant HT control field. The aggregated control subfield defines a set of control subfields, which can have 4 or more bits each. FIG. 6A is a diagram of one embodiment of the format of the control subfield. FIG. 6B is a diagram of one embodiment of the format of the control information subfield.

Figure 7:
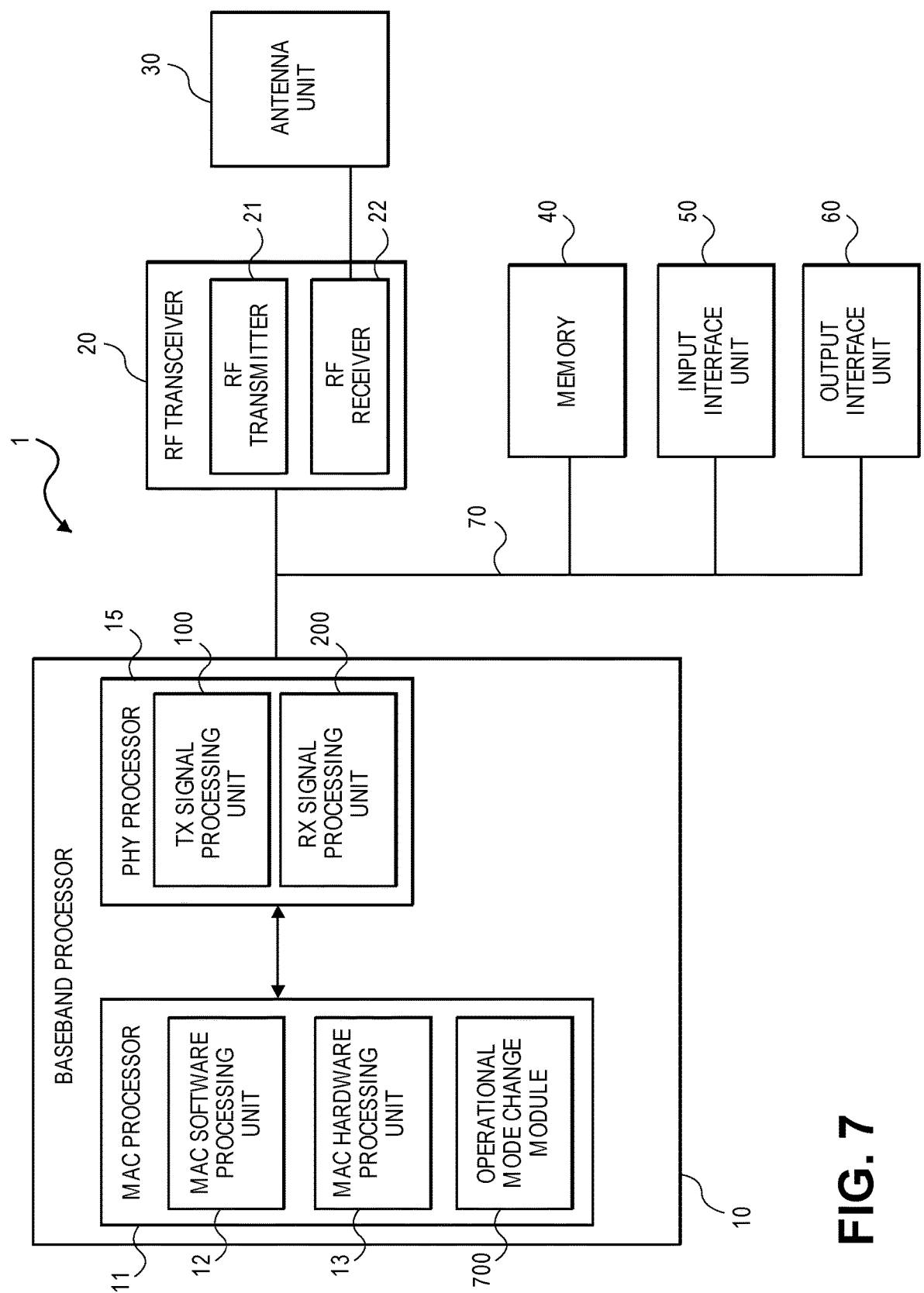
FIG. 7 is a block diagram of a network device implementing a STA or AP that executes a random access process and module, according to some embodiments.
Figure 8:
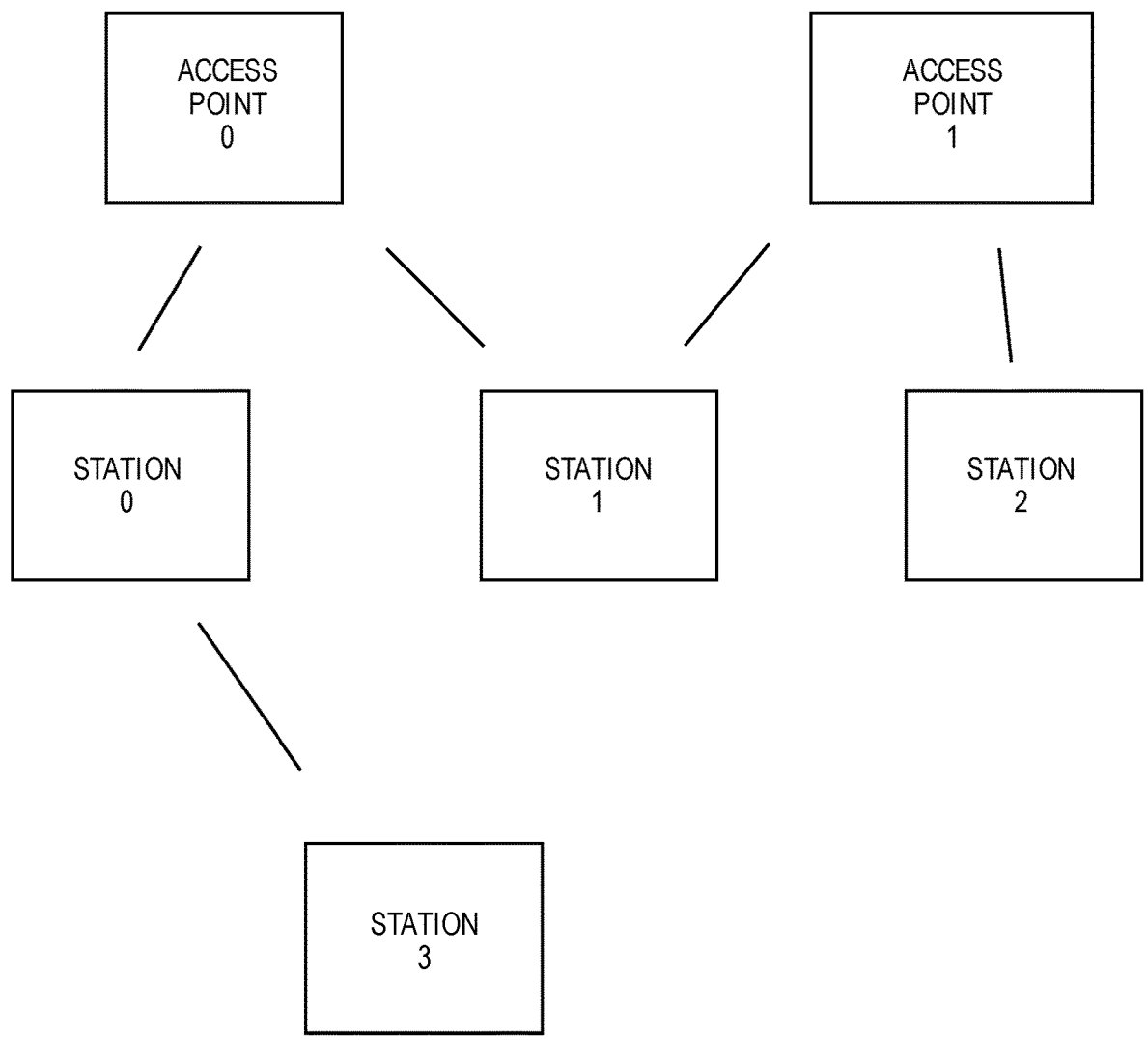
FIG. 8 is a block diagram of a WLAN, according to some embodiments.

FIG. 7 is a block diagram of a network device implementing a STA or AP that executes a random access process and module, according to some embodiments. In a wireless local area network (WLAN) such as the example WLAN illustrated in FIG. 8, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 8) and the other WLAN devices may be non-AP stations (non-AP STAs), (e.g., stations 0-3 in FIG. 8). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 8, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also executes the RX operational change module 700. The operating mode change module 700 can implement the respective functions for any combination of the embodiments described herein above with regard to FIGS. 1-5. In other embodiments, the operating mode change module 700 may be implemented by or distributed over both the PHY processor 15 and the MAC processor 11. The UL MU simultaneous transmission module 700 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 9:
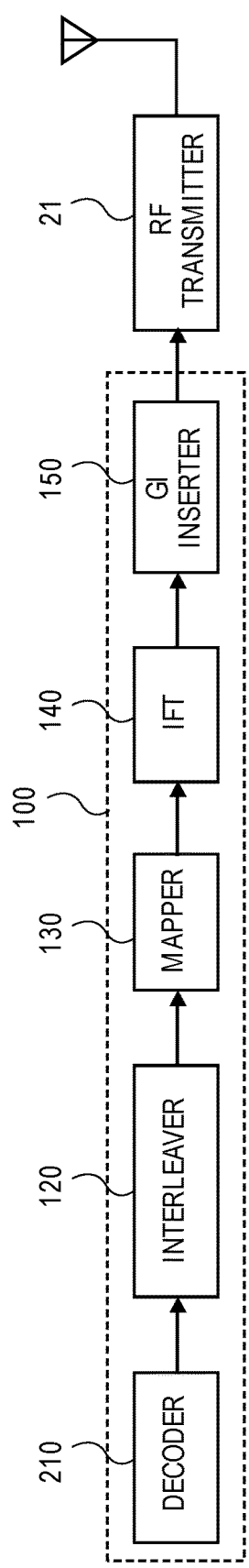
FIG. 9 is a schematic block diagram exemplifying a transmitting signal processor in a WLAN device, according to some embodiments.

FIG. 9 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 10:
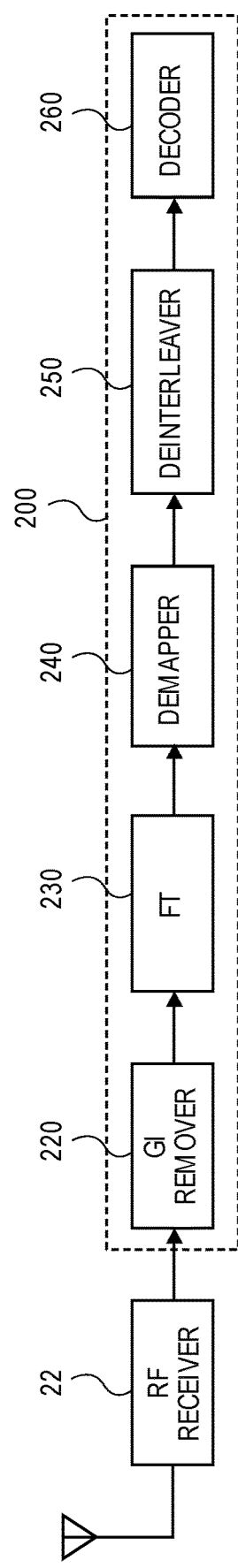
FIG. 10 is a schematic block diagram exemplifying a receiving signal processing unit in the WLAN, according to some embodiments.

FIG. 10 is a schematic block diagram exemplifying a receiving signal processing unit in the WLAN, according to some embodiments. Referring to FIG. 10, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 11:
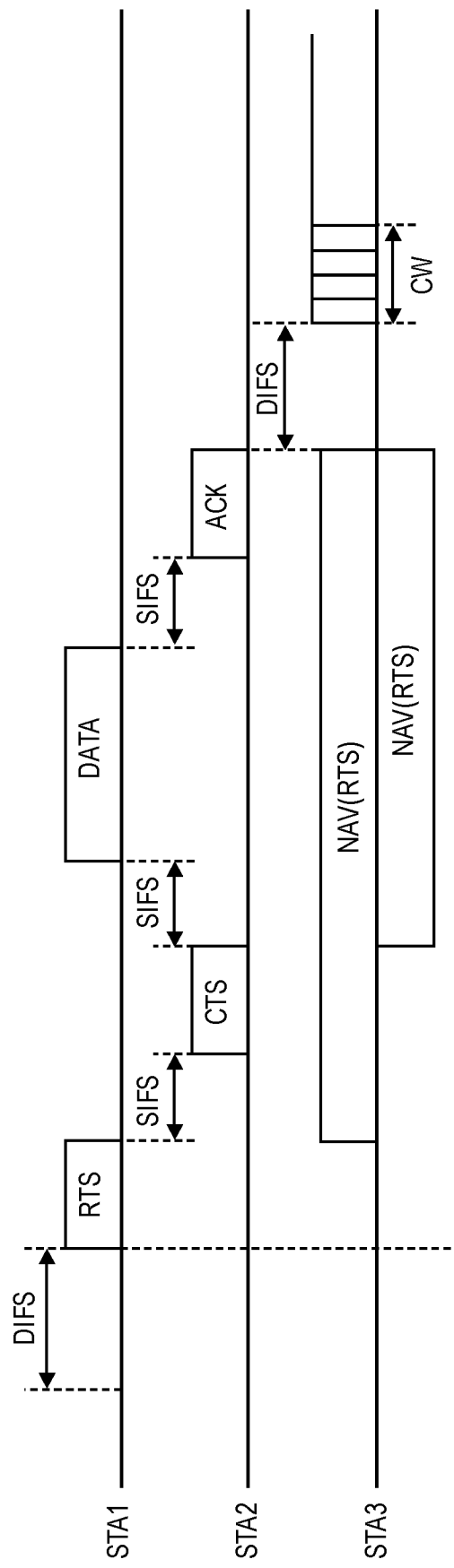
FIG. 11 is a timing diagram providing an example of the Carrier Sense Multiple Access/Collision Avoidance (CSMA/CA) transmission procedure, according to some embodiments.

FIG. 11 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

Figure 12:
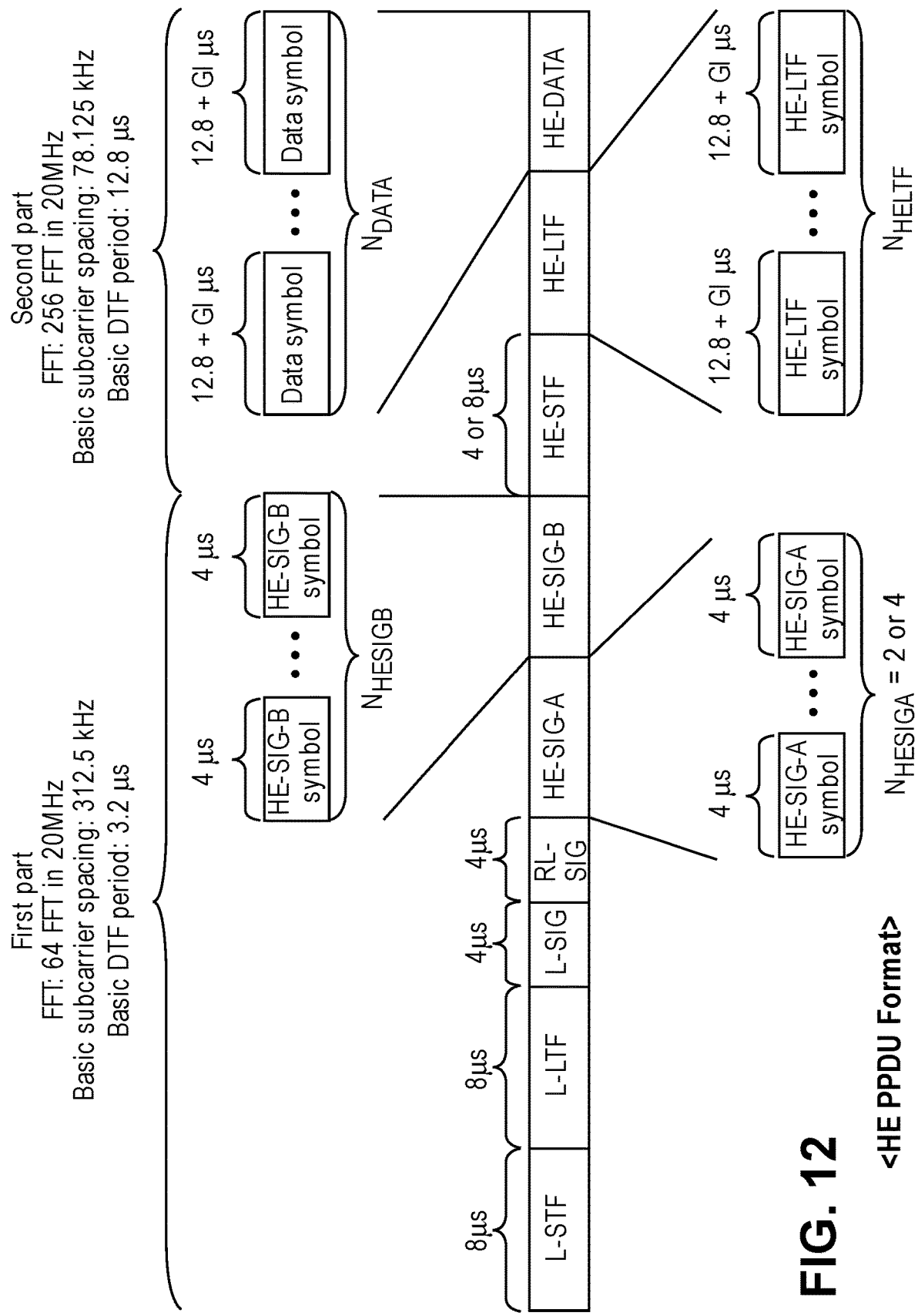
FIG. 12 is a diagram of one embodiment of a format of a high efficiency (HE) physical layer convergence procedure protocol data unit (HE PPDU).

FIG. 12 is a diagram of one embodiment showing a format of a high efficiency (HE) physical layer convergence procedure (PLCP) protocol data unit (HE PPDU) according to an embodiment.

A transmitting STA generates a PPDU frame and transmits it to a receiving STA. The receiving STA receives, detects, and processes the PPDU. The PPDU frame comprises an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field comprises $N_{HESIGA}$ symbols, the HE-SIG-B field comprises $N_{HESIGB}$ symbols, the HE-LTF field comprises $N_{HELTF}$ symbols, and the HE-DATA field comprises $N_{DATA}$ symbols.

FIG. 13 is a diagram of a table that describes fields of the PPDU frame in more detail.

The solutions provided herein have been described with reference to a wireless LAN system; however, it should be understood that these solutions are also applicable to other network environments, such as cellular telecommunication networks, wired networks, etc.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments, it should be understood that such order is exemplary (e.g., alternative embodiments may perform the operations in a different order, combine certain operations, overlap certain operations, etc.).

Those skilled in the art will recognize that the present disclosure is not limited to the embodiments described, and that the techniques described herein can be practiced with modification and alteration within the spirit and scope of the appended claims. The description is thus to be regarded as illustrative instead of limiting.

What is claimed is:

1. A method implemented by a receiving station in a Wireless Local Area Network (WLAN) to initiate a change in a receive operating mode during a current transmission opportunity (TXOP) of a transmitting station, the method comprising:
    sending, by the receiving station, a receive operating mode change to the transmitting station, wherein the receive operating mode change requests changes to at least one receive operating mode parameter associated with at least one transmission from the transmitting station to the receiving station; and
    changing, by the receiving station, the at least one receive operating mode parameter based on the receive operating mode change when the at least one receive operating mode parameter changes from higher receiver resource usage to lower receiver resource usage,
    wherein changing the at least one receive operating mode parameter occurs only after completion of the current TXOP when the at least one receive operating mode parameter changes from higher receiver resource usage to lower receiver resource usage.

2. The method of claim 1, further comprising:
determining whether the receive operating mode change requests a change of the at least one receive operating mode parameter (1) from higher receiver resource usage, which is used during the current TXOP, to lower receiver resource usage or (2) from lower receiver resource usage, which is used during the current TXOP, to higher receiver resource usage; and
changing, in response to determining that the receive operating mode change requests a change of the at least one receive operating mode parameter from lower receiver resource usage to higher receiver resource usage after receiving an acknowledgment from the transmitting station of the receive operating mode change.

3. The method of claim 2 further comprising:
receiving, by the receiving station from the transmitting station during the current TXOP, one or more frames, wherein the receiving station receives the one or more frames using the at least one receive operating mode parameter, which has been changed to go from lower receiver resource usage to higher receiver resource usage according to the receive operating mode change.

4. The method of claim 1, further comprising:
changing the at least one receive operating mode parameter only after receiving an acknowledgement of the receive operating mode change from the transmitting station.

5. The method of claim 1, wherein the at least one receive operating mode parameter includes a number of spatial streams or a channel bandwidth used by the receiving station to receive a transmission from the transmitting station.

6. The method of claim 5, wherein the at least one receive operating mode parameter changes from higher receiver resource usage to lower receiver resource usage when the receive operating mode change indicates a smaller number of spatial streams than used during the current TXOP or a narrower bandwidth than used during the current TXOP.

7. The method of claim 1 further comprising:
receiving, by the receiving station from the transmitting station during a subsequent TXOP, one or more frames, wherein the receiving station receives the one or more frames using the at least one receive operating mode parameter, which has been changed to go from higher receiver resource usage to lower receiver resource usage according to the receive operating mode change, wherein the subsequent TXOP is after the current TXOP.

8. The method of claim 1, wherein the transmitting station is an access point that controls a basic service set in which the receiving station is associated.

9. A method implemented by a transmitting station in a Wireless Local Area Network (WLAN) to initiate a change in a receive operating mode during a current transmission opportunity (TXOP) of the transmitting station, the method comprising:
receiving, by the transmitting station, a receive operating mode change from a receiving station, wherein the receive operating mode change requests changes to at least one receive operating mode parameter associated with at least one transmission from the transmitting station to the receiving station; and
changing, by the transmitting station, the at least one receive operating mode parameter based on the receive operating mode change, when the at least one receive operating mode parameter changes from higher receiver resource usage to lower receiver resource usage,
wherein changing the at least one receive operating mode parameter occurs only after completion of the current TXOP when the at least one receive operating mode parameter changes from higher receiver resource usage to lower receiver resource usage.

10. The method of claim 9, further comprising:
determining whether the receive operating mode change requests a change of the at least one receive operating mode parameter (1) from higher receiver resource usage, which is used during the current TXOP, to lower receiver resource usage or (2) from lower receiver resource usage, which is used during the current TXOP, to higher receiver resource usage; and
changing, in response to determining that the receive operating mode change requests a change of the at least one receive operating mode parameter from lower receiver resource usage to higher receiver resource usage after receiving an acknowledgment from the transmitting station of the receive operating mode change.

11. The method of claim 10, further comprising:
sending, by the transmitting station to the receiving station during the current TXOP, one or more frames, wherein the transmitting station sends the one or more frames using the at least one receive operating mode parameter, which has been changed to go from lower receiver resource usage to higher receiver resource usage according to the receive operating mode change.

12. The method of claim 9, further comprising:
changing the at least one receive operating mode parameter only after sending an acknowledgement of the receive operating mode change from the transmitting station.

13. The method of claim 9, wherein the at least one receive operating mode parameter includes a number of spatial streams or a channel bandwidth used by the receiving station to receive a transmission from the transmitting station.

14. The method of claim 13, wherein the at least one receive operating mode parameter changes from higher receiver resource usage to lower receiver resource usage when the receive operating mode change indicates a smaller number of spatial streams than used during the current TXOP or a narrower bandwidth than used during the current TXOP.

15. The method of claim 9, further comprising:
sending, by the transmitting station to the receiving station during a subsequent TXOP, one or more frames, wherein the transmitting station sends the one or more frames using the at least one receive operating mode parameter, which has been changed to go from higher receiver resource usage to lower receiver resource usage according to the receive operating mode change, wherein the subsequent TXOP is after the current TXOP.

16. The method of claim 9, wherein the transmitting station is an access point that controls a basic service set in which the receiving station is associated.

17. A method implemented by a first station in a Wireless Local Area Network (WLAN) to initiate a change in a receive operating mode during a current transmission opportunity (TXOP) of a second station, the method comprising:
determining, by the first station, whether to change a receive operating mode parameter during the current TXOP; and
changing, by the first station, during the current TXOP, the receive operating mode parameter where the change to the receive operating mode parameter increases receiver resource usage, in response to receiving an acknowledgement of the change from the second station.

18. The method of claim 17, further comprising:

changing, by the first station, during a TXOP after the current TXOP, the receive operating mode parameter where the change to the receive operating mode parameter decreases receiver resource usage.

19. The method of claim 17, further comprising:

sending, by the first station, a receive operating mode change to the second station, where the receive operating mode change requests changes to the receive operating mode parameter.

20. The method of claim 17 further comprising:

receiving, by the first station from the second station, during the current TXOP, a set of data frames, where transmission of the set of data frames is using the changed receive operating mode parameter.

* * * * *